United States Patent [19]
Dahill et al.

[11] 3,947,881
[45] Mar. 30, 1976

[54] SERVO POSITIONING ERROR CONTROL FOR MAGNETIC DISK FILE

[75] Inventors: Edward Kevin Dahill, St. Louis Park; Ronald Bruce Howes, Jr., Minneapolis, both of Minn.

[73] Assignee: Control Data Corporation, Minneapolis, Minn.

[22] Filed: Apr. 21, 1975

[21] Appl. No.: 570,522

[52] U.S. Cl. ............................ 360/78; 360/77
[51] Int. Cl.² G11B 5/58; G11B 21/08; G11B 19/14
[58] Field of Search ............ 360/78, 77, 75, 27, 86, 360/98, 99, 69; 346/137

[56] References Cited
UNITED STATES PATENTS

| | | | |
|---|---|---|---|
| 3,246,307 | 4/1966 | Stanley | 360/78 |
| 3,534,344 | 10/1970 | Santana | 360/77 |
| 3,737,883 | 6/1973 | Sordello et al. | 360/78 |
| 3,864,740 | 2/1975 | Sordello et al. | 360/77 |
| 3,883,894 | 4/1975 | Johnson | 360/78 |

Primary Examiner—Alfred H. Eddleman
Attorney, Agent, or Firm—William J. McGinnis, Jr.

[57] ABSTRACT

In a magnetic disk file head positioning control system, the servo loop controlling the fine positioning of magnetic heads for a particular head track is responsive to a servo error signal. The servo error signal consists of a low pass filtered head position error signal summed with a pseudo velocity signal derived from the same head position error signal.

6 Claims, 2 Drawing Figures

200
SERVO POSITIONING ERROR CONTROL FOR MAGNETIC DISK FILE

BACKGROUND OF THE INVENTION

This invention relates to magnetic disk file systems of the type used primarily in connection with computer systems as memory storage. More particularly this invention relates to the fine positioning control system for the magnetic heads in such magnetic disk files. A head control system is provided in which a fine position feedback control signal is derived solely from a head position error signal.

An earlier effort at providing a position responsive servo feedback loop in a magnetic disk file is illustrated by U.S. Pat. No. 3,246,307. This patent relates to a disk system having comparitively low track density compared to present day, state of the art, systems. Consequently, the patent implies that when the position error signal is at a zero value, the fine tracking characteristics of the head with respect to the magnetic disk track is fully corrected. This is not the case, however, since even a position error signal having a zero value, based on its history, can have a velocity component which requires a position correction component. This further correction component is required in high track density disks representative of the present state of the art.

Typically, the manner in which the present state of the art high track density, magnetic disk files obtain velocity information for head position correction purposes is by use of a velocity transducer such as a stationary coil in proximity to a magnet mounted on the head arm assembly or by measuring current changes in the voice coil actuator for the head arm assemblies. Thus, typical present state of the art system would have two separate signals generated in order to control head positioning.

One problem with a second source of head information is that it is typically obtained from a location remote from the head. Where this information is obtained from a remote transducer, such as a velocity transducer associated with the rod that passes through the voice coil, extraneous signals are introduced partially because of mechanical couplings and linkages. Where the requirement is to position the head and obtain information about head position, it is desirable to get the information directly from the head.

SUMMARY OF THE INVENTION

The present invention is a fine positioning servo control mechanism for use with high density disks in which all of the required position control signals for the servo mechanism are developed from a single position error signal derived from information received by an individual magnetic head in relation to the magnetic tracks on a servo disc.

The position error control signal developed according to the present invention consists of the sum of the position error signal passed through a low pass filter which provides a second order roll-off of frequency response and a pseudo velocity signal. The pseudo velocity signal is formed by inverting the position error signal and integrating the result.

In the figures:

FIG. 1 is a schematic diagram of a servo error control according to the present invention, and FIG. 2 is a schematic diagram of the system function of the system functioning with the present invention.

DESCRIPTION OF THE PREFERRED EMBODIMENTS

Figure 1:
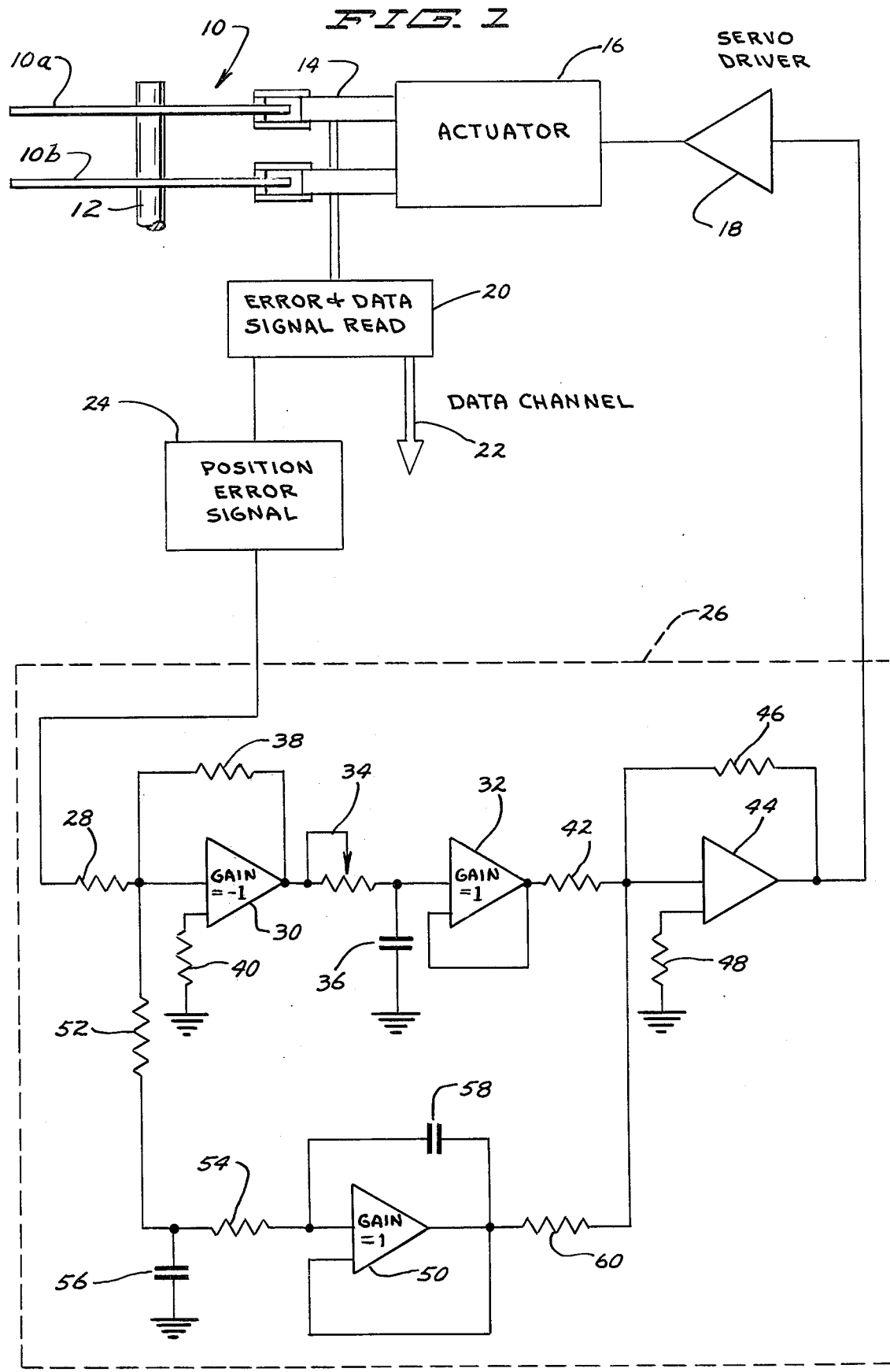

Referring now to FIG. 1, a magnetic disk pack 10 is shown schematically rotating on a spindle 12, shown schematically. The disk pack has a servo disk 10a and a record disk 10b. One of the servo disk surfaces has prerecorded tracks which provide information concerning where information is written and retrieved on the record disks. A head and arm assembly 14 is positioned in operable relation to the rotating disk. An electromechanical actuator 16 is provided to support and move the head assembly 14. In turn, the electromechanical actuator 16 is controlled by a servo driver 18. It is the object of this invention to provide an electrical control means for the servo driver 18.

From the head assembly 14 an electrical connection is made to conventional electrical circuits 20 for reading and deriving the electrical information magnetically recorded on the tracks on the disk pack 10. From the error and data signal read circuit box 20 a data channel 22 is derived containing the information from record disk 10b. The position information signals derived from servo disk 10a are transferred to a position error signal box 24 which derives the required position error signal information for use in controlling the servo driver. The position error signal box 24 may contain elements such as those disclosed in U.S. Pat. No. 3,534,344 for the purpose of providing position error signal information. The position error signal is transferred to the elements within servo error control unit 26 shown in a dotted line box according to one form of the present invention. The output from box 26 is a position control signal connected with the servo driver 18.

The position error signal from box 24 is applied to an input resistor 28 which is connected with an inverter 30. The output of the inverter 30 is connected with an integrator amplifier 32 through a variable resistor 34 which is adjustable to adapt the specific values of the circuit to individual units with which it is used. Capacitor 36 is connected between ground and the input to amplifier 32. Resistor 34 and capacitor 36 determine the characteristic of the integration function. Both the inverter 30 and the integrator 32 are formed by conventional operational amplifiers as indicated with the triangular symbol and the associated circuit components as shown to provide the desired circuit characteristics. Inverter 30 is associated with resistors 38 and 40. The output of integrator amplifier 32 is coupled through resistor 42 to summing amplifier 44, whose characteristics are controlled by feedback resistor 46 and bias resistor 48. The output of amplifier 42 constitutes the output signal of the servo error control unit 26 which is connected with the servo driver 18.

Derived from the input to inverter 30 is the input to a low pass filter 50 having a second order roll-off of amplitude with respect to frequency. This input passes through series resistors 52 and 54. Capacitor 56 is connected to ground from the junction of resistors 52 and 54. Capacitor 58 serves as a feedback capacitor for filter amplifier 50. The roll-off filter characteristics are determined by capacitors 56 and 58 in combination with resistors 52 and 54. The roll-off characteristics are determined so that the servo control is more responsive to low frequency position error signals than to high frequency position error signals. Typically the frequency of error signals of greatest interest in controlling the servo driver are those in the range under 500

Hz.

A coupling resistor 60 connects the output of this low pass filter to the input of summing amplifier 44. Resistor 46 controls the gain of summing amplifier 44 together with resistor 48. The ratio of the component of the low pass filter 50 signal to the pseudo velocity component in the summed servo control signal is inversely proportional to the ratio of values of resistors 60 and 42.

Figure 2:
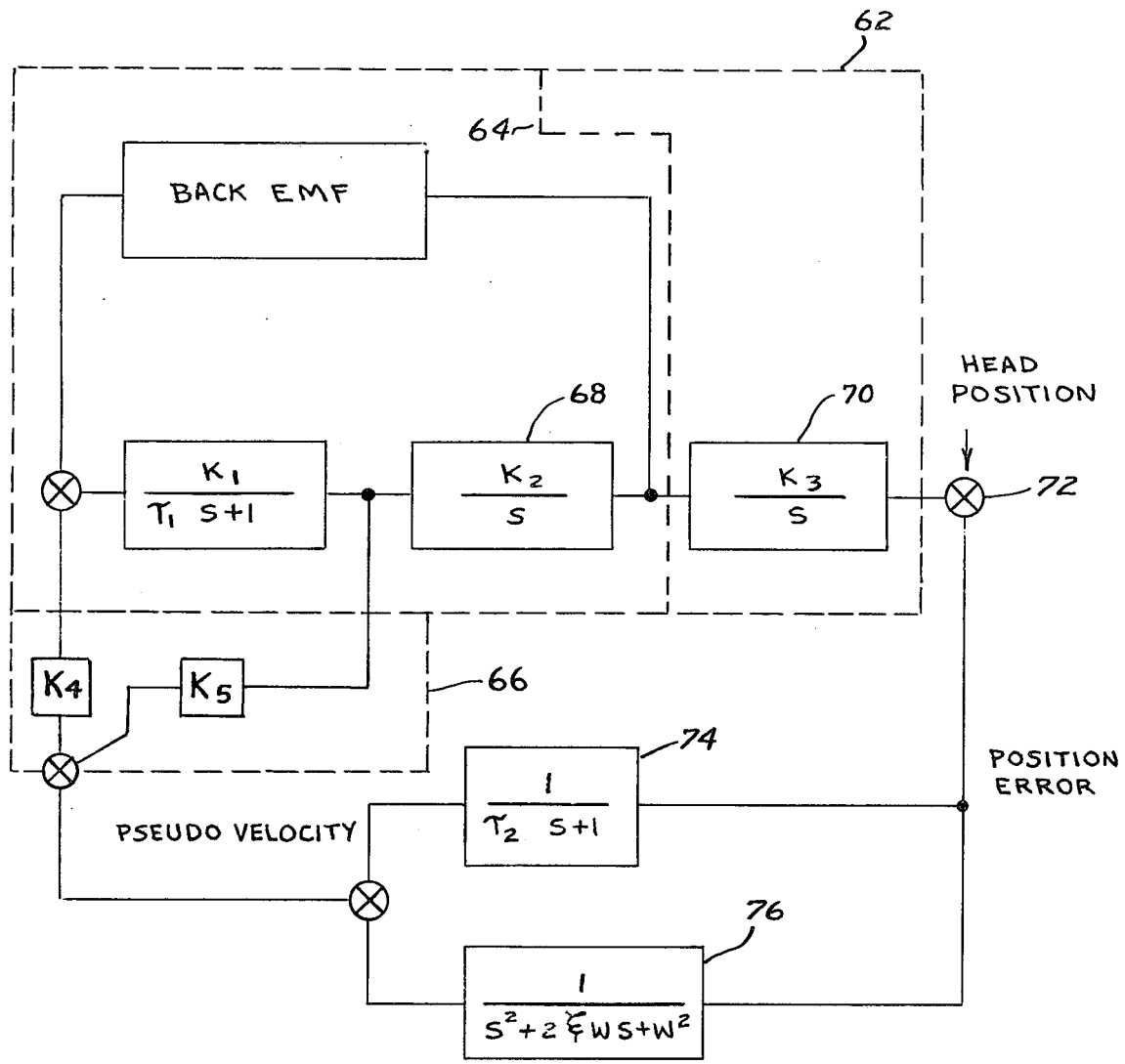

Referring now to FIG. 2, reference numeral 62 designates a dotted line box showing the system characteristics derived for the mechanical and electrical components of the magnetic disk system. The electrical characteristics of the head positioning coil which is equivalent to the actuator 16 shown in FIG. 1 is designated by reference numeral 64. The servo driver 18 from FIG. 1 is represented by the system function shown in box 66. The mass components and coil interaction with the mass of the system is designated in combination by boxes 68 and 70. The position of the head with respect to the disk is designated by the crossed symbol 72. The system function of the mechanism according to the present invention is shown by boxes 74 and 76 referring to the pseudo velocity signal and the second order position roll-off filter signal respectively.

Referring again to FIG. 1, some specific examples will be given: In a machine of the type designated by Control Data Corporation as a Model 9756 where the head position error signal is at a sensitivity of 1000 volts/inch the second order position roll-off amplifier 50 has a unity gain at approximately 1400 Hz. Resistors 52 and 54 have values of 3.4 K Ohm. Capacitor 56 has a value of 0.01 µfd. and capacitor 58 has a value of 0.1 µfd. Resistor 60 has a value of 7.3 K Ohm. Amplifiers 30 and 32 have a gain of unity. Resistor 34 is adjusted to have a value of approximately 6.8 K Ohm and capacitor 36 has a value of 0.1 µfd. Resistor 42 has a value of 8.3 K Ohm and resistor 46 has a value of 20 K Ohm.

In a different type of machine where the head position error signal has a sensitivity of 2500 volts/inch such as Control Data Corporation Model 9770, all of the above values would be identical except that resistors 34, 42, 46 and 60 would have the values 2.4 K Ohm, 4.8 K Ohm, 5 K Ohm and 3.7 K Ohm, respectively.

What is claimed is:

1. In a magnetic disk memory storage system comprising a head assembly for use with a disk pack having at least one record disk and a servo track disk, an actuator assembly for said head assembly, and means for developing a head position error signal from signals received from said head assembly, the improvement comprising a servo error control for developing signals to control said actuator from signals received from said means for developing a head position error signal:

means for receiving head position error signals from said means for developing a head position error signal, means, connected with said means for receiving, for providing a low pass filter signal as an output signal, means, connected with said means for receiving, for inverting said head position error signals to produce an inverted head position error signal, means, connected with said means for inverting, for integrating said inverted head position error signal to produce a pseudo velocity signal, and means, connected with said means for integrating and with said means for providing a low pass filter signal, for summing said pseudo velocity signal and said low pass filter signal in a predetermined proportion as an output signal adapted to control said actuator.

2. The apparatus of claim 1 wherein said means for providing a low pass filter signal provides a second order roll-off of amplitude with frequency.

3. The apparatus of claim 2 wherein said means has unity gain at approximately 1400 Hz.

4. The apparatus of claim 1 in which said means for summing provides a greater proportion of said low pass filter signal in said output signal than said pseudo velocity signal.

5. The structure of claim 1 in which the system function of said pseudo velocity signal is of the form $$\frac{K}{T(S+1)}$$

where K and T are predetermined constants.

6. The structure of claim 1 in which the system function of the low pass filter signal is of the form $$\frac{K}{S^2+2\xi\omega S+\omega^2}$$

where K and $\xi$ are predetermined constants.

* * * * *